United States Patent
Wang

(10) Patent No.: US 11,755,956 B2
(45) Date of Patent: Sep. 12, 2023

(54) METHOD, STORAGE MEDIUM AND APPARATUS FOR CONVERTING 2D PICTURE SET TO 3D MODEL

(71) Applicant: SAMSUNG ELECTRONICS CO., LTD., Suwon-si (KR)

(72) Inventor: Lei Wang, Nanjing (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 212 days.

(21) Appl. No.: 17/257,665

(22) PCT Filed: May 20, 2019

(86) PCT No.: PCT/KR2019/006025
§ 371 (c)(1),
(2) Date: Jan. 4, 2021

(87) PCT Pub. No.: WO2020/032354
PCT Pub. Date: Feb. 13, 2020

(65) Prior Publication Data
US 2021/0279971 A1    Sep. 9, 2021

(30) Foreign Application Priority Data

Aug. 6, 2018   (CN) .......................... 201810884174.7

(51) Int. Cl.
*G06T 15/04*       (2011.01)
*G06N 20/00*       (2019.01)
(Continued)

(52) U.S. Cl.
CPC ........... *G06N 20/00* (2019.01); *G06F 18/213* (2023.01); *G06F 18/23* (2023.01); *G06F 18/24* (2023.01);
(Continued)

(58) Field of Classification Search
None
See application file for complete search history.

(56) References Cited

U.S. PATENT DOCUMENTS 6,466,205 B2 * 10/2002 Simpson .............. H04N 13/275
                                                         345/473
2013/0093790 A1    4/2013 Jin
(Continued)

FOREIGN PATENT DOCUMENTS

CN         102292707 A    12/2011
CN         103197980 A     7/2013
(Continued)

OTHER PUBLICATIONS

Ahmadzade AM, Farsi H. "Video summarization by an innovative method in shot detection." ELCVIA: electronic letters on computer vision and image analysis. Apr. 28, 2015; 14(1):21-37. (Year: 2015).*

(Continued)

*Primary Examiner* — Steven Z Elbinger
(74) *Attorney, Agent, or Firm* — Sughrue Mion, PLLC

(57) ABSTRACT

Provided are a method, a storage medium and an apparatus for converting a 2D picture set to a 3D model. The method includes: identifying the category of each object contained in each picture in the 2D picture set and outline information of each object by using a deep learning algorithm; extracting detail characteristic information of each object in each picture in the 2D picture set by using a computer vision algorithm, wherein the detail feature information at least includes texture information, color feature information and shape feature information of each object; matching the 3D model based on the category, the shape feature information and the outline information of each object, wherein the 3D model matched successfully is the 3D model of the object;

(Continued)

and mapping the texture information and the color feature information of each object onto the 3D model of each object.

20 Claims, 4 Drawing Sheets

(51) Int. Cl.
| | |
|---|---|
| *G06T 7/70* | (2017.01) |
| *G06N 3/08* | (2023.01) |
| *G06T 17/00* | (2006.01) |
| *G06T 19/00* | (2011.01) |
| *G06T 19/20* | (2011.01) |
| *G06V 20/40* | (2022.01) |
| *G06F 18/23* | (2023.01) |
| *G06F 18/24* | (2023.01) |
| *G06F 18/213* | (2023.01) |
| *G06N 3/045* | (2023.01) |

(52) U.S. Cl.
CPC .............. *G06N 3/045* (2023.01); *G06N 3/08* (2013.01); *G06T 7/70* (2017.01); *G06T 15/04* (2013.01); *G06T 17/00* (2013.01); *G06T 19/006* (2013.01); *G06T 19/20* (2013.01); *G06V 20/46* (2022.01); *G06T 2200/08* (2013.01); *G06T 2207/20084* (2013.01); *G06T 2207/30244* (2013.01); *G06T 2219/2012* (2013.01)

(56) References Cited

U.S. PATENT DOCUMENTS

| | | | |
|---|---|---|---|
| 2013/0113827 A1 | 5/2013 | Forutanpour et al. | |
| 2014/0115140 A1 | 4/2014 | Jin | |
| 2014/0152698 A1 | 6/2014 | Kim et al. | |
| 2016/0314512 A1* | 10/2016 | Kraft | G10L 15/22 |
| 2016/0379410 A1 | 12/2016 | Sharma et al. | |
| 2017/0085863 A1* | 3/2017 | Lopez | H04N 13/261 |
| 2018/0189611 A1* | 7/2018 | Dal Mutto | G06V 20/64 |
| 2018/0190033 A1 | 7/2018 | Barnett et al. | |
| 2018/0276899 A1 | 9/2018 | Liao et al. | |
| 2019/0066334 A1* | 2/2019 | Gu | G06T 7/80 |
| 2021/0346091 A1* | 11/2021 | Haslam | A61B 34/10 |

FOREIGN PATENT DOCUMENTS

| | | |
|---|---|---|
| CN | 103853913 A | 6/2014 |
| CN | 104054111 A | 9/2014 |
| CN | 105338117 A | 2/2016 |
| CN | 105608745 A | 5/2016 |
| CN | 105893377 A | 8/2016 |
| CN | 106227481 A | 12/2016 |
| CN | 106293052 A | 1/2017 |
| CN | 106445154 A | 2/2017 |
| CN | 106792160 A | 5/2017 |
| CN | 106851421 A | 6/2017 |
| CN | 107221346 A | 9/2017 |
| WO | 2018/126270 A1 | 7/2018 |

OTHER PUBLICATIONS

Communication dated Aug. 27, 2019, issued by the International Searching Authority in counterpart International Application No. PCT/KR2019/006025 (PCT/ISA/210 and 237).

* cited by examiner

[Fig. 1]
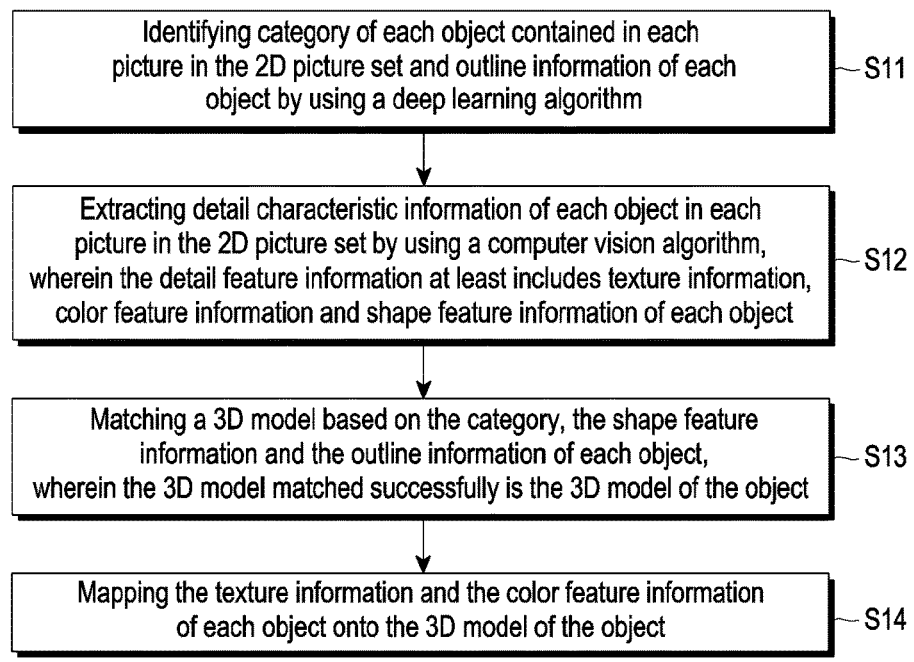
[Fig. 2]
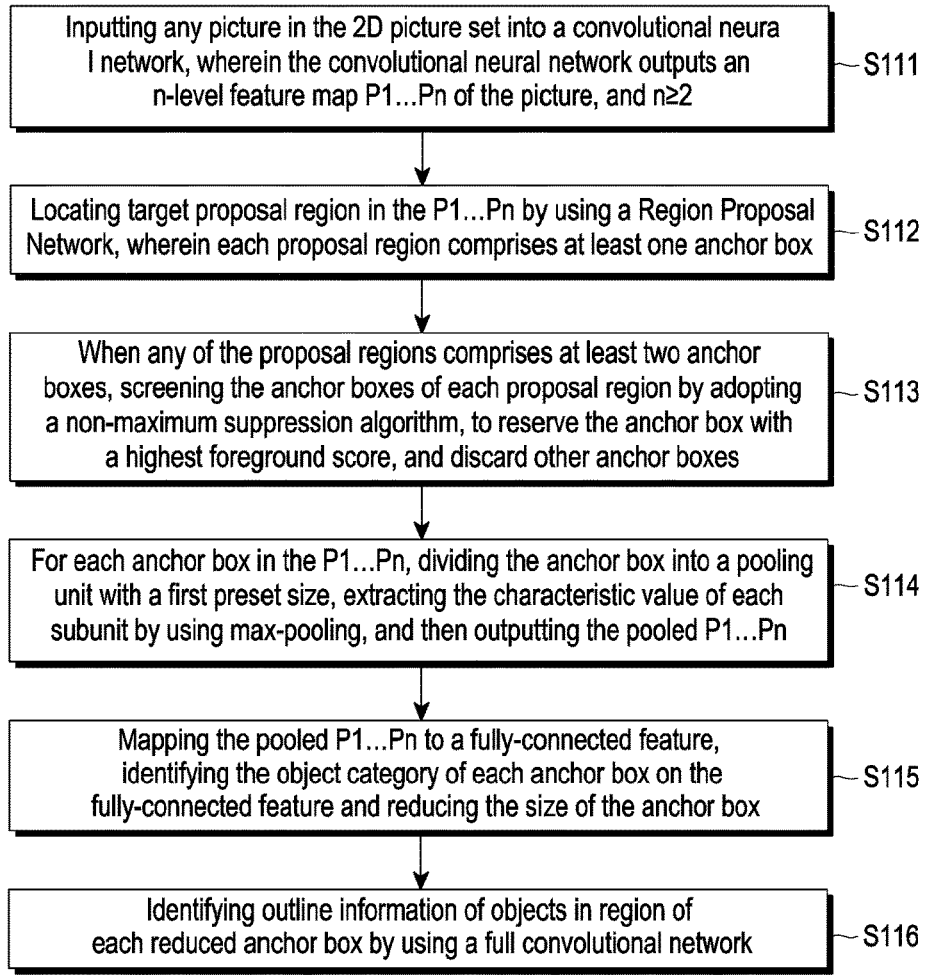

[Fig. 3]
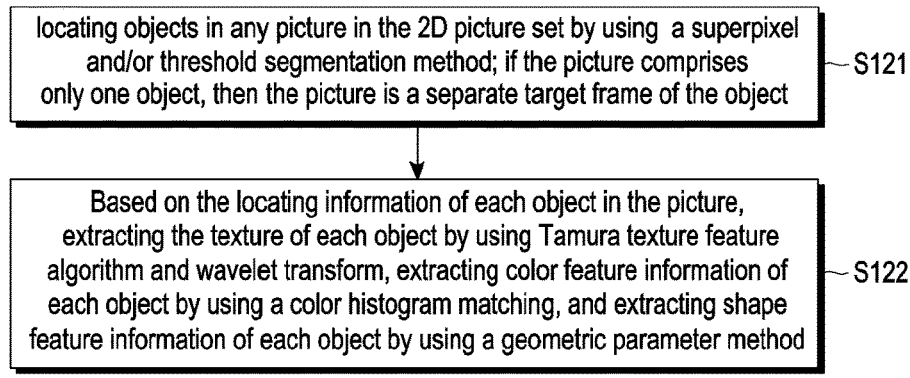
[Fig. 4]
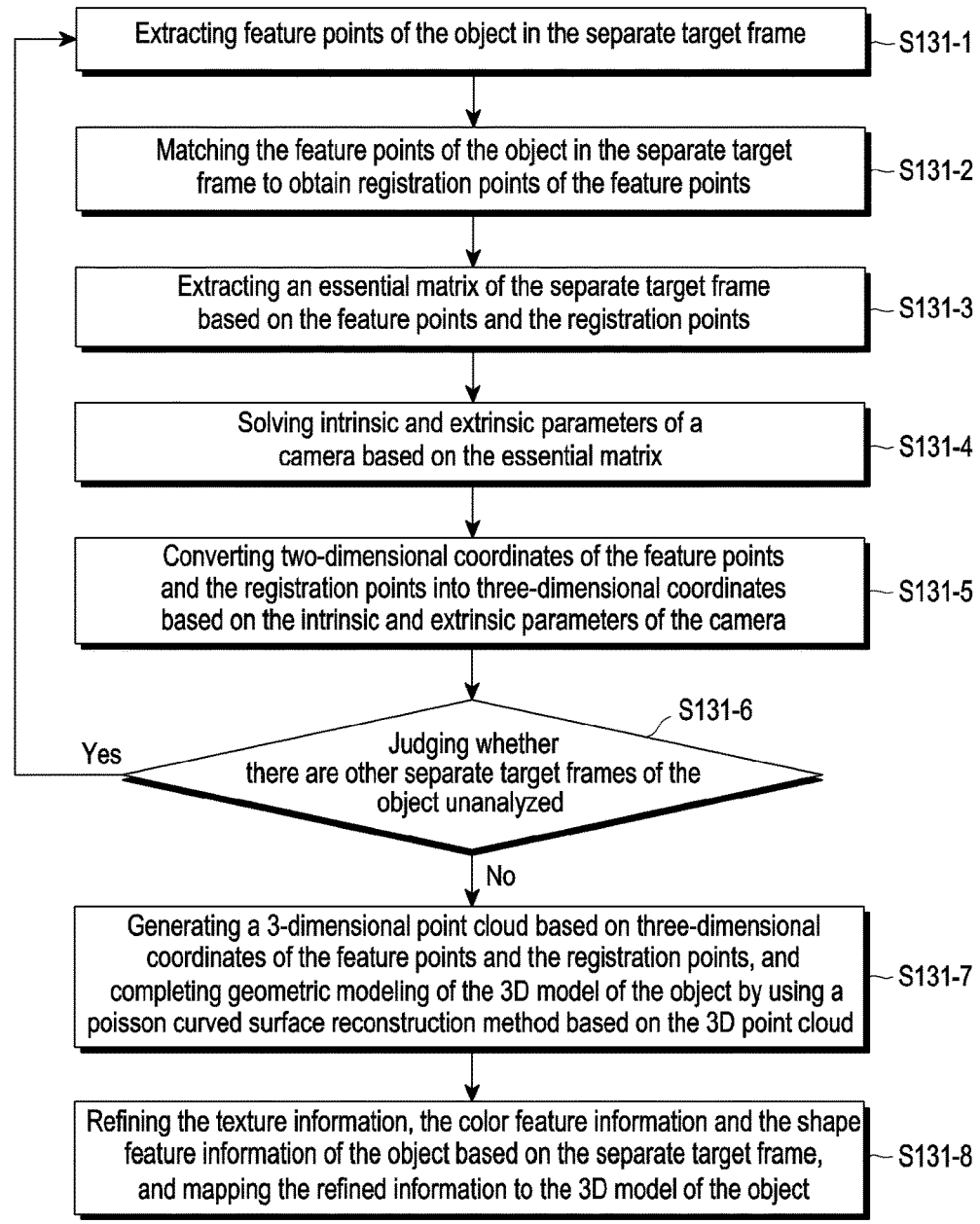

[Fig. 5]
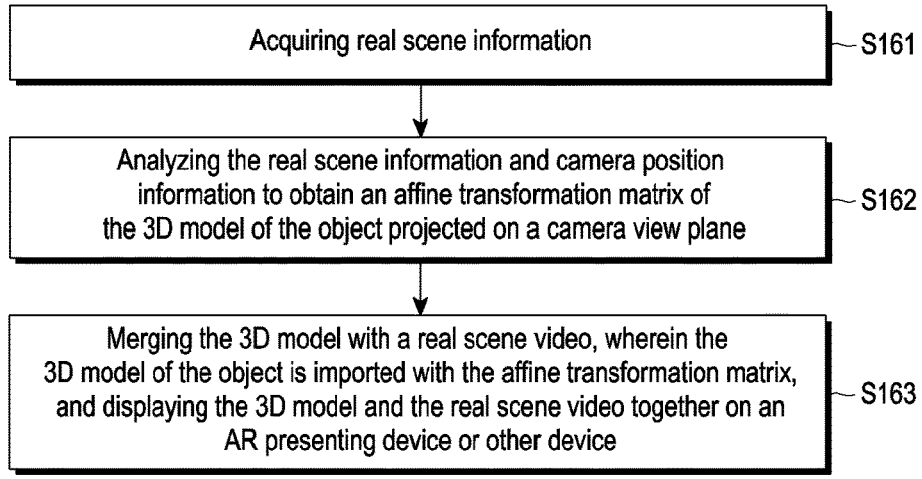
[Fig. 6]
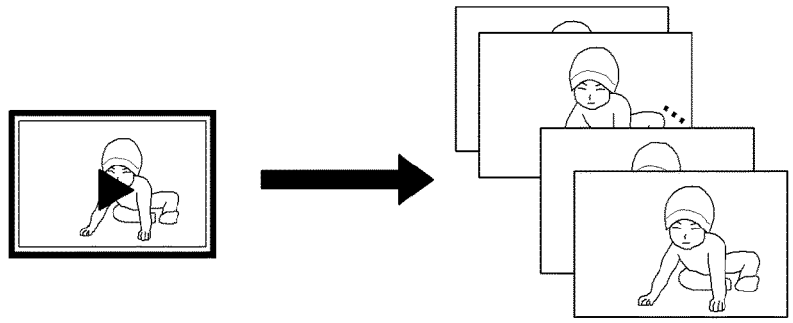
[Fig. 7]
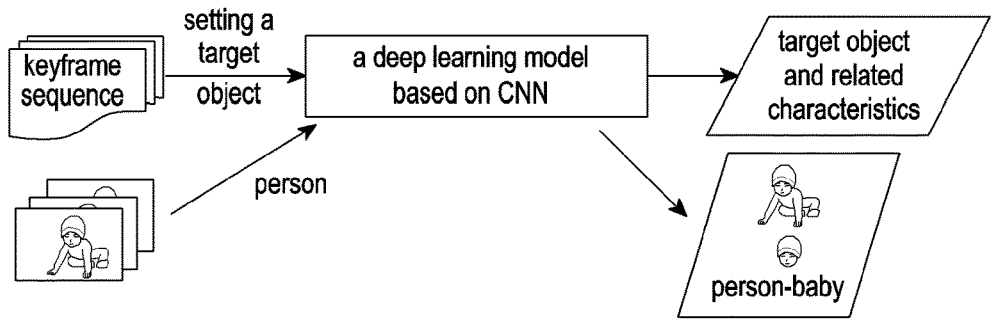
[Fig. 8]
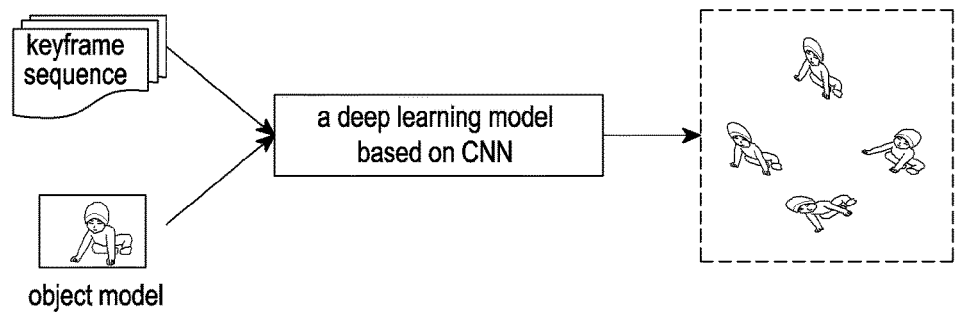

[Fig. 9]
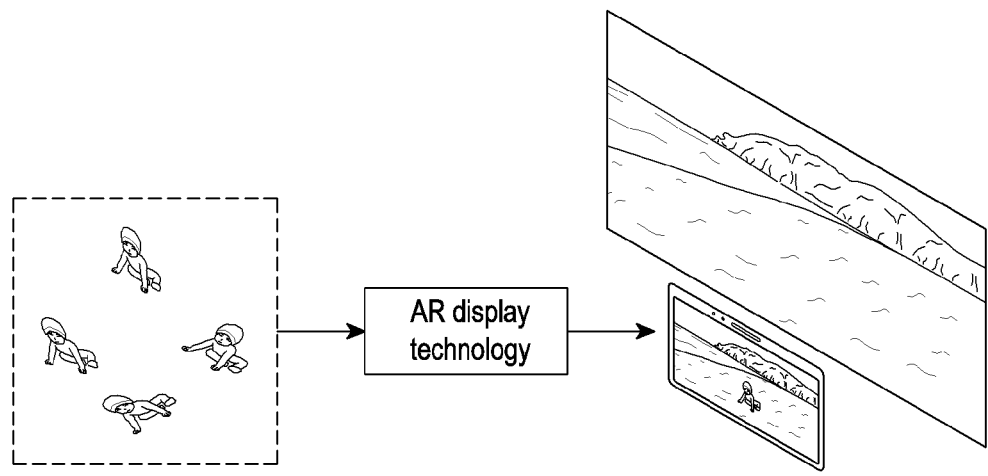

METHOD, STORAGE MEDIUM AND APPARATUS FOR CONVERTING 2D PICTURE SET TO 3D MODEL

CROSS-REFERENCE TO RELATED APPLICATIONS

This application is a National Phase Entry of PCT International Application No. PCT/KR2019/006025, which was filed on May 20, 2019, and claims priority to Chinese Patent Application No. 201810884174.7, which was filed on Aug. 6, 2018 in the Chinese Intellectual Property Office, the content of each of which are incorporated herein by reference.

TECHNICAL FIELD

The present disclosure relates to the computer field, and in particular to a method, a storage medium and an apparatus for converting a 2D picture set to a 3D model.

BACKGROUND ART

Currently, a 2D picture or video can be converted into a 3D model or a 3D video based on a parallax principle, which essentially generates two 2D pictures that are different for left and right eyes, not a substantial 3D model. The parallax is an illusion, therefore, a user may feel uncomfortable, distorted and easily fatigued when watching the 3D model or 3D video generated based on parallax, the user's experience can be poor, and entertainment and interestingness can be influenced.

DISCLOSURE OF INVENTION

Solution to Problem

Accordingly, the present disclosure provides a method, a storage medium and an apparatus for converting a 2D picture set to a 3D model, so as to solve the problem of how to construct a 3D model based on a 2D picture set.

The present disclosure provides a method for converting a 2D picture set to a 3D model, wherein, the 2D picture set includes at least one picture, and the method includes:

step 11, identifying the category of each object contained in each picture in the 2D picture set and outline information of each object by using a deep learning algorithm;

step 12, extracting detail characteristic information of each object in each picture in the 2D picture set by using a computer vision algorithm, wherein the detail feature information at least includes texture information, color feature information and shape feature information of each object;

step 13, matching a 3D model based on the category, the shape feature information and the outline information of each object, wherein the 3D model matched successfully is the 3D model of the object; and step 14, mapping the texture information and the color feature information of each object matched successfully onto the 3D model of the object.

The present disclosure also provides a non-transitory computer-readable storage medium storing instructions that, when executed by a processor, cause the processor to perform steps in the method for converting the 2D picture set to the 3D model described above.

The present disclosure also provides an apparatus for converting a 2D picture set to a 3D model, including a processor and a non-transitory computer-readable storage medium described above.

The present disclosure provides a method for converting a 2D picture set to a 3D model, image information of the object in the 2D picture is extracted, 3D model is matched, after the matching is successful, the texture information and the color feature information of the object extracted from the 2D picture are mapped onto the 3D model, so as to construct a realistic 3D model, which doesn't exist the defect of generating a 3D model and a 3D video based on parallax, therefore, the user's experience of the 3D video or 3D model can be improved, and the entertainment and interestingness can be enhanced.

BRIEF DESCRIPTION OF DRAWINGS

FIG. 1 is a flowchart illustrating a method for converting a 2D picture set to a 3D model according to some examples of the present disclosure;

FIG. 2 is an example of step 11 in FIG. 1;

FIG. 3 is an example of step 12 in FIG. 1;

FIG. 4 is an example of step 131 according to some examples of the present disclosure;

FIG. 5 is an example of step 16 according to some examples of the present disclosure;

FIG. 6 is a schematic diagram illustrating video decoding according to some examples of the present disclosure;

FIG. 7 is a schematic diagram illustrating child extracting according to some examples of the present disclosure;

FIG. 8 is a schematic diagram illustrating child posture synchronization according to some examples of the present disclosure; and FIG. 9 is a schematic diagram illustrating AR scene implementation according to some examples of the present disclosure.

MODE FOR THE INVENTION

In order to make the object, technical solutions, and merits of the present disclosure clearer, the present disclosure will be illustrated in detail hereinafter with reference to the accompanying drawings and detailed examples.

The present disclosure provides a method for converting a 2D picture set to a 3D model, as shown in FIG. 1, the 2D picture set includes at least one picture, and the method includes:

step 11 (S11), category of each object contained in each picture in the 2D picture set and outline information of each object is identified by using a deep learning algorithm.

The outline information includes not only periphery of each object, but also position information of the periphery, center point coordinates of the periphery, width and height of the periphery and the like.

The deep learning algorithm includes an unsupervised pre-trained network, a convolutional neural network, a recurrent neural network, a recursive neural network, and the like, and any one or combination of networks capable of identifying the category and outline information of the object from 2D pictures is applicable to the present disclosure.

For example, FIG. 2 is an implementation of step 11, after performing the method as shown in FIG. 2, each picture can obtain the category information and outline information of each object in the picture, and the method includes:

step 111, any picture in the 2D picture set is inputted into a convolutional neural network, to obtain an n-level feature map P1 . . . Pn of the picture, and n>=2.

The Convolutional Neural Network CNN (Convolutional Neural Network) model is generally used to do feature extracting work. The backbone network of the CNN includes residual network ResNeXt-101 and feature pyramid network FPN.

The residual network ResNeXt-101 is a simple, highly modular network structure for image classification, and is to extract features in CNN. The present disclosure also improves the network structure of ResNeXt-101, by using an acceleration strategy, and replacing 3×3 convolution of the ResNeXt-101 with a depth wise separable convolution, so that model miniaturization is achieved and n-level features C0 . . . Cn−1 is output.

The feature pyramid network FPN, as an extension of ResNeXt-101, enables the entire CNN network to better characterize the target on multiplescales. And the performance of the pyramid extracting standard features is improved by adding a second pyramid, wherein, Pn−1 is obtained by 1×1 convolution of Cn−1, Pn−2 is obtained by 1×1 convolution of Cn−2 plus sampling on Pn−1. Pn−3 is obtained by 1×1 convolution of Cn−3 plus sampling on Pn−2; Pn−4 is obtained by 1×1 convolution of Cn−4 plus sampling on Pn−3. Pn is obtained by 1×1 max-pooling of Pn−1.

The output of a first pyramid from bottom layer to top layer is sequentially input to top layer to bottom layer of a second pyramid, for example, the second pyramid can select high-level features from the first pyramid and transfer them to the bottom layer. Based on this process, features at each level are allowed be combined with high-level and low-level features.

As a backbone network, ResNeXt101+FPN is used to extract features, and finally outputs feature map P1 . . . Pn, in the FPN, the second pyramid has a feature map containing features of each level, rather than a single backbone feature map in the standard backbone (i.e., a highest layer Cn−1 in the first pyramid), and the strategy for selecting features are as follows: selecting which level of features is dynamically determined by the target size.

step 112, target proposal region in the P1 . . . Pn is located by using a Region Proposal Network, wherein each proposal region includes at least one anchor box.

The Region Proposal Network (RPN) takes any convolution feature map as an input, and outputs a proposal region of the convolution feature map, each proposal region contains a plurality of anchor boxes, which is similar to the step of Selective Search in the target detection.

The RPN scans the feature map with a sliding window and looks for the presence of a target region, the region scanned is referred to as an anchor (also referred to as an anchor box), five specifications (32, 64, 128, 256, 512) of anchor are defined, and each specification has 3 ratios (1:1, 1:2, 2:1).

RPN produces 2 outputs for each region: class cls (object or no object) of the anchor and bounding-box precision reg (change percentages in x, y, width and height). The sliding window adopts a special fully-connected layer with two branches for outputting the class and the precision of the anchor.

The specific implementation is as follows: if a 512-dimensional fc feature is generated, mapping from a feature map to a first fully-connected feature is implemented by a convolutional layer Conv2D with Num_out=512, kernel_size=3×3, stride=1, padding is same. Then, mapping from feature at a previous layer to features of two branches cls and reg is implemented by two convolutional layers Conv2D with Num_out=2×15 (15 is the class of anchor 5×3)=30 and Num_out=5×15=75, respectively, kernel_size=1×1, stride=1, padding is valid.

Anchor containing the target can be located with prediction of the RPN, and the position and the size of the anchor containing the target are finely adjusted.

Step 113, when any of the proposal regions includes at least two anchor boxes, the anchor boxes of each proposal region may be screened by adopting a non-maximum suppression algorithm, to reserve the anchor box with the highest foreground score, and discard other anchor boxes.

If the plurality of anchors selected by the PRN overlap with each other, non-maximum suppression can be adopted, to reserve the anchor with the highest foreground score, and discard the rest.

Step 114, for each anchor box in the P1 . . . Pn, the anchor box is divided into a pooling unit with a first preset size, extracted characteristic value of each subunit by using max-pooling, and then output pooled P1 . . . Pn;

step 115, the pooled P1 . . . Pn is mapped to a fully-connected feature, the object category of each anchor box is identified on the fully-connected feature and the size of the anchor box is reduced;

In step 115, an object-based anchor box needs a fully-connected layer to identify the object category, and the fully-connected layer can only process input with a fixed size, however, the anchor boxes obtained in step 113 have different sizes. Step 114 is required to normalize the anchor box confirmed in step 113 into the first preset size, and the specific implementation includes:

a. each anchor box may be traversed, to keep the boundary of a floating-point number performing no quantization.

b. proposal region may be divided into m×m units, and boundary of each unit also does not perform quantization.

c. fixed coordinate positions may be calculated in each unit, and values of these 4 positions may be calculated by using a bilinear interpolation method, and then max-pooling operation is performed. The fixed position refers to a position determined by a fixed rule in each rectangular unit. For example, if the number of sampling points is 4, the unit is averaged into four small blocks, and then their respective center points are determined. It is apparent that the coordinates of these sample points are typically floating-point numbers, therefore, the pixel values thereof are obtained with an interpolated method.

Step 115 mainly relates to a classification analysis algorithm and a regression analysis algorithm to obtain a classification of the anchor box, and a regression of an anchor bounding-box. As with the RPN, the classification analysis algorithm and regression analysis algorithm generates two outputs for each anchor box: category (specifically, category of object) and fine adjustment of bounding-box (further finely adjust the position and size of the anchor bounding-box).

The specific implementation for the classification analysis algorithm and regression analysis algorithm is as follows:

a. if a 1024-dimensional fc feature is generated, mapping from P1 . . . Pn to a first fully-connected feature is implemented by a convolutional layer with Num_out=1024, kernel_size=3×3, stride=1, padding is valid.

b. The first fully-connected feature is followed by a BatchNormal, then relu is activated and then dropout, wherein, rate of dropout is 0.5.

c. Then, another 1024-dimensional fc feature is output, mapping to a second fully-connected feature is implemented by a convolutional layer Conv2D with Num_out=1024, kernel_size=1×1, stride=1, padding is valid, a BatchNormal is followed, and then relu is activated.

d. Finally, mapping from feature at a previous layer to features of two branches softmax classification (the region is classified into specific categories, such as person, car, chair, and etc.) and linear regression (further finely adjust the position and size of the bounding-box) is implemented by two fully-connected layers with Num_out is 80 (category of class of the object identified) and 4×80=320 (position information multiplied by category of class), respectively.

Step 116, outline information of objects in the reduced anchor box region is identified by using a full convolutional network.

The Full Convolutional Network FCN may achieve pixel-wise classification (i.e., end to end, pixel-wise). The Full Convolutional Network FCN takes the positive region selected by the anchor box classification as an input, generates a mask thereof, segments pixels of different objects based on the mask and determines outline information of the object.

For example, the FCN may be composed of four same convolutional layers Conv2D with num_out=256, kernel_size=3×3, stride=1, padding is valid, and one deconvolutional layer (num_out=256, kernel_size=2×2, stride=2), and then be mapped to a mask binarizing layer sigmoid with an output dimension of 80, Conv2D(80,(1,1),strides=1, activation="sigmoid").

The mask generated is low in resolution: 14×14 pixels, a predicting mask is enlarged to the size of the anchor bounding-box to give a final mask result, and each object has one mask.

Step 12, detail characteristic information of each object in each picture in the 2D picture set is extracted by using a computer vision algorithm; the detail feature information at least includes texture information, color feature information and shape feature information of each object.

In addition to the texture information, the color feature information and the shaped characteristic information of the object, the detailed characteristic information of the present disclosure may also include: whether the 2D picture is a separate target frame of the object.

In particular, step 12 is accomplished by step 121 and step 122, as shown in FIG. 3.

step 121, locating objects in any picture in the 2D picture set by using a superpixel and/or threshold segmentation method; if the picture includes only one object, then the picture is a separate target frame of the object;

step 122, based on the locating information of each object in the picture, the texture of each object is extracted by using Tamura texture feature algorithm and wavelet transform, color feature information of each object is extracted by using a color histogram matching, and shape feature information of each object is extracted by using a geometric parameter method.

Shape features of an object are calculated, for example, by using a shape parameter method (shape factor) relating to shape quantitative measurement (e.g., length, width, moment, area, perimeter, etc.). If a plurality of objects are included, then the shape ratio between objects is also calculated.

Step 13, matching the 3D model is performed based on the category, the shape feature information and the outline information of each object, and the 3D model matched successfully is the 3D model of the object.

Matching the existing models in the 3D model library (3Dmax) may be performed according to the category, the shape feature information (such as, length, width, height), and the outline information of each object acquired by identification. The matching rule may be as follows, first match the category, match the shape feature information in the same category, after the matching of the shape feature information is completed, match the outline, to match models progressively and orderly.

step 14, mapping the texture information and the color feature information of each object matched successfully onto the 3D model of the object is performed.

The present disclosure provides a method for converting a 2D picture set to a 3D model, image information of the object in the 2D picture is extracted, 3D model is matched, after the matching is successful, the texture information and the color feature information of the object extracted from the 2D picture are mapped onto the 3D model, so as to construct a realistic 3D model, which doesn't exist the defect of generating a 3D model and a 3D video based on parallax, therefore, the user's experience of the 3D video or 3D model can be improved, and the entertainment and interestingness can be enhanced.

In addition, the step 13 further includes: if the matching fails, then step 131 is performed;

Step 131, constructing a 3D model of the object based on the separate target frame of the object matched unsuccessfully is performed.

Specifically, as shown in FIG. 4, step 131 includes:

Step 131-1, feature points of an object in the separate target frame may be extracted.

Step 131-2, matching the feature points of the object in the separate target frame is performed to obtain registration points of the feature points.

The separate target frame only includes information of one object, wherein, step 131 and step 132 may be implemented by using a Scale Invariant Feature Transform (Scale Invariant Feature Transform) algorithm, which is an excellent image matching algorithm with better robustness to rotation, scale and perspective. In some examples, other feature extraction algorithms may be considered, such as SURF, ORB, and the like.

Registration points of a feature point also needs to be screened, for example, by using a Ratio Test method, 2 registration points that best match the feature point are sought by using the KNN algorithm, if the ratio between the matching distance of the first registration point and that of the second registration point is less than a certain threshold, then this match is accepted, otherwise, it is deemed to be as mismatching.

In some examples, a Cross Test method may be also used to screen the feature points and the registration points.

Step 131-3, an essential matrix of the separate target frame may be extracted based on the feature points and the registration points.

Step 131-4, intrinsic and extrinsic parameters of a camera may be solved based on the essential matrix.

Step 131-5, converting two-dimensional coordinates of the feature points and the registration points into three-dimensional coordinates may be performed based on the intrinsic and extrinsic parameters of the camera.

Step 131-6, judging whether there are other separate target frames of the object unanalyzed may be performed, if yes, returning to step 131-1, otherwise, step 131-7 is performed.

Step 131-7, a 3-dimensional point cloud may be generated based on three-dimensional coordinates of the feature points and the registration points, and geometric modeling of the 3D model of the object may be completed by using a Poisson curved surface reconstruction method based on the 3D point cloud.

Once the registration points are obtained, the essential matrix may be resolved by using the newly added function findEssentialMat ( ) in OpenCV3.0. After the essential matrix is obtained, another function recover Pose is used to decompose the essential matrix and return the relative transformation R and T, namely the intrinsic and extrinsic parameters of the camera, between two cameras, and complete calibration of the camera.

After the intrinsic and extrinsic parameters of the camera are solved, the two-dimensional coordinates of the feature points and the registration points are converted into three-dimensional coordinates, a sparse three-dimensional point cloud is generated, and then a dense point cloud is obtained by using PMVS2. There are a lot of the point cloud processing methods, and PMVS2 is only one of them.

Further, based on the 3D point cloud, geometric modeling of the 3D model of the object is completed by using the Poisson curved surface reconstruction method;

Step 131-8, refining the texture information, the color feature information and the shape feature information of the object may be performed based on the separate target frame, and the refined information may be mapped onto the 3D model of the object.

Finally, feature parameters of object-related feature information are refined, for example, body proportion, head feature, eyes, mouth, nose, eyebrows, facial contour in a person object, these parameters are acquired and then synchronously mapped onto a 3D model, and a real target model is reconstructed.

The method in FIG. 1 of the present disclosure may be also applied to a 2D video in addition to a 2D picture, in the case of 2D video, before step 11, the method further includes:

Step 10, key frames may be extracted in a 2D video as pictures in the 2D picture set.

Specifically, this step may be as follows:

Step 101, decoding the 2D video may be performed to acquire all static frames of the 2D video;

Step 102, clustering analysis may be performed on all the static frames to extract a static frame with the largest entropy in each cluster as a key frame of the cluster.

For example, one 1-minute video (1800 frame data) may obtain 30 key frames after performing steps 101 and 102 described above.

The detailed flow is as follows:

a. a video file is opened, data is read into a buffer from a hard disk, video file information is acquired, and a video file in the buffer is sent to a decoder for decoding.

b, the 2D video is decoded to acquire all static frames of the 2D video.

Decoders, including the FFMPEG, the MediaCodec of the Android platform, the AVFoundation of the IOS platform and the like, all can decode the 2D video to obtain a sequence of static frames of the 2D video.

c. The static frames are aggregated into n clusters by performing clustering analysis, the static frames in each cluster are similar, while static frames between different clusters are dissimilar.

If frame number in one cluster is too small, the frame is directly merged with the adjacent frame. For each cluster, a centroid is maintained, for each frame, the similarity of its cluster centroid is calculated. If the similarity is less than a certain threshold, then it is classified into a new cluster, otherwise it is added to the previous cluster.

d. One representative is extracted from each cluster as a key frame, for example, an image with the largest entropy in each cluster may be calculated and used as a key frame.

In some examples, after step 14 or step 131, the method further includes:

Step 15, a posture of any object in any picture in the 2D picture set may be identified, and the posture of the 3D model of the object may be adjusted to be consistent with the posture of the object.

Step 16, the adjusted 3D model may be rendered into an AR scene.

Assuming that a plurality of pictures are included in the 2D picture set, step 15 and step 16 may be performed one by one according to time information (e.g., a generation time) of the picture so that dynamic AR contents may be formed.

Furthermore, as shown in FIG. 5, step 16 includes:

Step 161, real scene information may be acquired.

Step 162, analyzing the real scene information and camera position information may be performed to obtain an affine transformation matrix of the 3D model projected on a camera view plane.

Step 163, merging the 3D model with a real scene video may be performed, the 3D model of the object is imported with the affine transformation matrix, and the 3D model and the real scene video may be displayed together on an AR presenting device or other device.

Merging video or displaying directly, that is, the graphics system first calculates an affine transformation matrix between the virtual object (3D model of the object) coordinates to the camera view plane according to the camera position information and the positioning marks in the real scene, and then draws the virtual object on the view plane according to the affine transformation matrix, and finally displays the 3D model and the real scene video together on an AR presenting device or other displays after directly merging with the real scene video.

When the key frames in the 2D video sequentially generate corresponding 3D models one by one, the corresponding 3D models are put into the VR environment one by one, and corresponding AR contents based on the 2D video may be generated.

What described above is description of a method for converting a 2D picture set to a 3D model of the present disclosure, and examples of applying the method of the present disclosure are set forth below.

Example 1

In some examples, a user takes a 2D video of a child playing with a mobile phone, the video may be converted to a piece of AR content based on the method of the present disclosure, and the user may directly watch the AR content to experience a sense of being personally on the scene. Specific operations are carried out as follows:

Step 201: parsing the 2D video is performed; the video is opened to acquire all static frames of the video, the static frames are analyzed to find and save a key frame, as shown in FIG. 6.

Step 202, identifying and extracting child and related feature information in the key frame may be performed by using a deep learning algorithm and a computer vision algorithm, as shown in FIG. 7.

Upon extracting, not setting the target object can be selected and a default object is adopted, and the default object includes person, car, chair, cup, bird, cow, cat, dog, sheep and etc. A specific extracting object may be also selected, for example, only target object of the person and the relevant characteristics are extracted. Alternatively, a target object framed manually and related characteristics may be also extracted.

Step 203: identifying the category and the feature information of the object may be performed according to step 202, and retrieving and matching corresponding model category in the 3D model library may be performed, for example, in this example, the extracting object is a child (person category), first, 3D model matching the child is retrieved in the 3D model library.

Then, according to the extracted child detail features such as eyes, mouth, nose, eyebrows, facial contour, textures and the like, these parameters are then synchronized to corresponding model to make the 3D model more vivid and realistic, and a 3D model of the child consistent with the key frame information is built.

Step 204: according to the key frame obtained in the step 201 and the 3D model generated in the step 203, the posture of the model is adjusted. The posture of the 3D model may be adjusted to the posture in the key frame, and actions of the child in the video may be synchronized to the model, as shown in FIG. 8.

Step 205: the action behaviors corresponding to the child model and the model are rendered into an AR scene, and displayed on the AR presenting device or other display, as shown in FIG. 9.

Step 206: the AR content of the child playing is created successfully.

Example 2

In some examples, sometimes, a user may not watch the car exhibition at the scene for some reason, but only can watch ordinary videos of the car on the exhibition taken by his friend. The video may be converted into a piece of AR content based on the method of the present disclosure, so that the user may watch the car in a sense of being personally on the scene.

Step 301: parsing the 2D video is performed; the video is opened to acquire all static frames of the video, the static frames are analyzed to find and save a key frame.

Step 302, identifying and extracting car and related feature information in the key frame may be performed by using a deep learning algorithm and a computer vision algorithm.

Upon extracting, not setting the target object can be selected and a default object is adopted, and the default object includes person, car, chair, cup, bird, cow, cat, dog, sheep and etc. A specific extracting object may be also selected, for example, only target object of the person and the relevant features are extracted. Alternatively, a target object framed manually and related features may be also extracted.

Step 303: identifying the category and the feature information of the object may be performed according to step 202, and retrieving and matching corresponding model category in the 3D model library may be performed, for example, in this example, the extracting object is a car, first, 3D model matching the car is retrieved in the 3D model library.

Then, according to the extracted car detail features such as shape, color, textures and the like, these parameters are then synchronized to corresponding model to make the 3D model more vivid and realistic.

Step 304: according to the key frame obtained in the step 301 and the 3D model generated in the step 303, the posture of the model is adjusted. The posture of the 3D model may be adjusted to the posture in the key frame, and various angles of watching the car in the video may be synchronized to the model.

Step 305: the direction corresponding to the car model and the model are rendered into an AR scene, and displayed on the AR presenting device or other display.

Step 306: the AR content of the car exhibition is created successfully.

Example 3

In some examples, a user often watches some 2D performance videos. The video may be converted into a piece of AR content based on the method of the present disclosure, so that the user or others may experience of watching on the scene in a sense of being personally on the scene.

Step 401: parsing the 2D video is performed; the video is opened to acquire all static frames of the video, the static frames are analyzed to find and save a key frame.

Step 402, identifying and extracting stage and related feature information in the key frame may be performed by using a deep learning algorithm and a computer vision algorithm.

Upon extracting, not setting the target object can be selected and a default object is adopted, and the default object includes person, car, chair, cup, bird, cow, cat, dog, sheep and etc. A specific extracting object can also be selected to be set as a stage, for example, only target object of the stage and the relevant features are extracted. Alternatively, a target object framed manually and related features may be also extracted.

Step 403: identifying the category and the feature information of the object may be performed according to step 202, and retrieving and matching corresponding model category in the 3D model library may be performed, for example, in this example, the extracting object is a stage, first, 3D model matching the stage is retrieved in the 3D model library.

Then, according to the extracted stage detail features such person, seat, performance property and the like, these parameters are then synchronized to corresponding model to make the 3D model more vivid and realistic.

Step 404: according to the key frame obtained in the step 401 and the 3D model generated in the step 403, the posture of the model is adjusted. The posture of the 3D model may be adjusted to the posture in the key frame, and actions in the video may be synchronized to the model.

Step 405: the stage model and the direction corresponding to the stage model and the model are rendered into the AR scene, and displayed on the AR presenting device or other display.

Step 406: the AR content of the performance is created successfully.

The present disclosure also provides a non-transitory computer-readable storage medium storing instructions that, when executed by a processor, cause the processor to perform any of the steps in the method for converting the 2D picture set to the 3D model described above.

The present disclosure also provides an apparatus for converting a 2D picture set to a 3D model, including a processor and a non-transitory computer-readable storage medium described above.

Specifically, an apparatus for converting a 2D picture set to a 3D model, the 2D picture set includes at least one picture, and the apparatus includes:

an object category and outline identifying module, configured to identify the category of each object contained in each picture in the 2D picture set and outline information of each object by using a deep learning algorithm;

an object detail feature extracting module, configured to extract detail characteristic information of each object in each picture in the 2D picture set by using a computer vision algorithm, wherein the detail feature information at least includes texture information, color feature information and shape feature information of each object;

a model matching module, configured to match a 3D model based on the category, the shape feature information and the outline information of each object, wherein the 3D model matched successfully is the 3D model of the object; and a 3D object refining module, configured to map the texture information and the color feature information of each object matched successfully onto the 3D model of the object.

In some examples, before the object category and outline identifying module, the apparatus further includes:

a key frame extracting module, configured to extract key frames in a 2D video as pictures in the 2D picture set.

In some examples, the key frame extracting module includes:

a video decoding module, configured to decode the 2D video to acquire all static frames of the 2D video;

a clustering analyzing module, configured to perform clustering analysis on all the static frames to extract a static frame with the largest entropy in each cluster as a key frame of the cluster.

In some examples, the object category and outline identifying module includes:

a convolutional neural network, configured to input any picture in the 2D picture set into the convolutional neural network, wherein the convolutional neural network outputs an n-level feature map P1 . . . Pn of the picture, and n>=2;

a region construction network, configured to locate target proposal region in the P1 . . . Pn by using the Region Proposal Network, wherein each proposal region includes at least one anchor box;

an anchor box screening module, when any of the proposal regions includes at least two anchor boxes, configured to screen the anchor box of each proposal region by adopting a non-maximum suppression algorithm, reserve the anchor box with the highest foreground score, and discard other anchor boxes;

a pooling module, for each anchor box in the P1 . . . Pn, configured to divide the anchor box into a pooling unit with a first preset size, extract the feature value of each subunit by using max-pooling, and then output the pooled P1 . . . Pn;

a classification and regression module, configured to map the pooled P1 . . . Pn to a fully-connected feature, identify the object category of each anchor box on the fully-connected features and reduce the size of the anchor box; and a full convolutional network, configured to identify outline information of objects in region of each reduced anchor box by using the full convolutional network.

In some examples, the convolutional neural network includes a residual network and a feature pyramid network, wherein 3×3 convolution of the residual network is replaced with a depth wise separable convolution.

In some examples, the feature pyramid network includes a first pyramid and a second pyramid, and the output of the first pyramid from bottom layer to top layer is sequentially input to top layer to bottom layer of the second pyramid.

In some examples, in the object detail feature extracting module, the detail feature also includes: whether the 2D picture is a separate target frame of an object.

Furthermore, the object detail feature extracting module includes:

an object locating module, configured to locate objects in any picture in the 2D picture set by using a superpixel and/or threshold segmentation method; if the picture includes only one object, then the picture is a separate target frame of the object; if the picture includes only one object, then the picture is a separate target frame of the object;

a detail feature parsing module, based on the locating information of each object in the picture, configured to extract the texture of each object by using Tamura texture feature algorithm and wavelet transform, extract color feature information of each object by using a color histogram matching, and extract shape feature information of each object by using a geometric parameter method.

In some examples, the model matching module further includes: if the matching fails, then a model constructing model is performed;

the model constructing model, configured to construct a 3D model of the object based on the separate target frame of the object matched unsuccessfully.

Furthermore, the model constructing model includes:

a feature point module, configured to extract feature points of the object in the separate target frame;

a registration point module, configured to match the feature points of the object in the separate target frame to obtain registration points of the feature points;

an essential matrix generating module, configured to extract an essential matrix of the separate target frame based on the feature points and the registration points;

a camera parameter parsing module, configured to solve intrinsic and extrinsic parameters of a camera based on the essential matrix;

a coordinate converting module, configured to convert two-dimensional coordinates of the feature points and the registration points into three-dimensional coordinates based on the intrinsic and extrinsic parameters of the camera;

a separate target frame remaining judgment module, configured to judge whether there are other separate target frames of the object unanalyzed, if yes, the feature point module is returned, otherwise, a 3D model constructing module is performed;

the 3D model constructing module, configured to generate a three-dimensional point cloud based on three-dimensional coordinates of the feature points and the registration points, and complete geometric modeling of the 3D model of the object by using a Poisson curved surface reconstruction method based on the 3D point cloud; and a 3D model refining module, configured to refine the texture information, the color feature information and the shape feature information of the object based on the separate target frame, and mapping the refined information to the 3D model of the object.

In some examples, after the 3D object refining module or the model constructing module, the apparatus further includes:

a posture synchronizing module, configured to identify a posture of any object in any picture in the 2D picture set, and adjust the posture of the 3D model of the object to be consistent with the posture of the object;

an AR projecting module, configured to render the adjusted 3D model into an AR scene.

Furthermore, the AR projecting module includes:

an information acquiring module, configured to acquire real scene information;

an affine transformation matrix resolving module, configured to analyze the real scene information and camera position information to obtain an affine transformation matrix of the 3D model of the object projected on a camera view plane; and a projecting module, configured to merging the 3D model with a real scene video, wherein the 3D model of the object is imported with the affine transformation matrix, and display the 3D model and the real scene video together on an AR presenting device or other device.

It should be noted that the examples of the apparatus for converting a 2D picture set to a 3D model of the present disclosure are the same as the principles of examples of the method for converting a 2D picture set to a 3D model, and relevant points may be cross-referenced.

The examples described above are merely preferred examples of the present disclosure and they do not limit the present disclosure. Any modification, equivalent replacement, and improvement made within the spirit and principle of technical solutions of the present disclosure shall fall within the scope of the present disclosure.

The invention claimed is:

1. A method for converting a 2D picture set to a 3D model, the 2D picture set comprising at least one picture, the method comprising:
   identifying a category and outline information of each object contained in each picture in the 2D picture set by using a deep learning algorithm;
   extracting detail feature information of each object in each picture in the 2D picture set by using a computer vision algorithm, wherein the detail feature information includes texture information, color feature information and shape feature information of each object;
   matching each object to a base 3D model retrieved from a pre-existing 3D model library based on the category, the shape feature information, and the outline information of each object; and
   mapping the texture information and the color feature information of each object onto the retrieved base 3D model matched to the object to generate an enhanced 3D model of the object.

2. The method of claim 1, wherein, before the identifying of the category and the outline information of each object contained in each picture in the 2D picture set, the method further comprises:
   extracting key frames in a 2D video as pictures in the 2D picture set.

3. The method of claim 2, wherein the extracting of the key frames in a 2D video as pictures in the 2D picture set comprises:
   decoding the 2D video to acquire all static frames of the 2D video; and
   performing clustering analysis on all the static frames to extract a static frame with a largest entropy in each cluster as a key frame of the cluster.

4. The method of claim 1, wherein the detail feature information further comprises: whether the 2D picture is a separate target frame of an object.

5. The method of claim 4, wherein the matching of the 3D model based on the category, the shape feature information and the outline information of each object further comprises:
   if the matching fails, constructing a 3D model of the object based on the separate target frame of the object being matched unsuccessfully.

6. The method of claim 5, wherein the constructing of a 3D model of the object based on the separate target frame of the object being matched unsuccessfully comprises:
   extracting feature points of the object in the separate target frame;
   identifying registration points among the feature points in the separate target frame by matching the feature points of the object to registration point features;
   extracting an essential matrix of the separate target frame based on the feature points and the registration points;
   solving intrinsic and extrinsic parameters of a camera based on the essential matrix;
   converting two-dimensional coordinates of the feature points and the registration points into three-dimensional coordinates based on the intrinsic and extrinsic parameters of the camera;
   judging whether there are other separate target frames of the object unanalyzed, if yes, returning the extracted feature points of the object in the separate target frame, otherwise, generating a 3-dimensional point cloud based on three-dimensional coordinates of the feature points and the registration points, and completing geometric modeling of the 3D model of the object by using a Poisson curved surface reconstruction method based on the 3D point cloud; and
   refining the texture information, the color feature information and the shape feature information of the object based on the separate target frame, and mapping the refined information to the 3D model of the object.

7. The method of claim 5, wherein, after the mapping the texture information and the color feature information of each object onto the 3D model of the object or the constructing a 3D model of the object based on the separate target frame of the object matched unsuccessfully, the method further comprises:
   identifying a posture of any object in any picture in the 2D picture set, and adjusting the posture of the 3D model of the object to be consistent with the posture of the object;
   rendering the adjusted 3D model into an AR scene.

8. The method of claim 7, wherein the rendering of the adjusted 3D model into the AR scene comprises:
   acquiring real scene information;
   analyzing the real scene information and camera position information to obtain an affine transformation matrix of the 3D model of the object projected on a camera view plane; and
   merging the 3D model with a real scene video, wherein the 3D model of the object is imported with the affine transformation matrix, and displaying the 3D model and the real scene video together on an AR presenting device or other device.

9. The method of claim 1, wherein the extracting of the detail feature information of each object in each picture in the 2D picture set comprises:
   locating objects in any picture in the 2D picture set by using a superpixel and/or threshold segmentation method, wherein, if the picture comprises only one object, then the picture is a separate target frame of the one object; and
   based on the locating of each object in the picture, extracting a texture of each object by using Tamura texture feature algorithm and wavelet transform, extracting color feature information of each object by using a color histogram matching, and extracting shape feature information of each object by using a geometric parameter method.

10. An apparatus for converting a 2D picture set to a 3D model, the 2D picture set comprising at least one picture, the apparatus comprising:

at least one processor configured to:
identify a category and outline information of each object contained in each picture in the 2D picture set by using a deep learning algorithm;
extract detail feature information of each object in each picture in the 2D picture set by using a computer vision algorithm, wherein the detail feature information includes texture information, color feature information and shape feature information of each object;
match each object to a base 3D model retrieved from a pre-existing 3D model library based on the category, the shape feature information and the outline information of each object; and
map the texture information and the color feature information of each object onto the retrieved base 3D model matched to the object to generate an enhanced 3D model of the object.

11. The apparatus of claim 10, wherein the at least one processor is further configured to:
before the identifying of the category of each object contained in each picture in the 2D picture set and the outline information of each object, extract key frames in a 2D video as pictures in the 2D picture set;
decode the 2D video to acquire all static frames of the 2D video; and
perform clustering analysis on all the static frames to extract a static frame with a largest entropy in each cluster as a key frame of the cluster for extracting the key frames in the 2D video as pictures in the 2D picture set.

12. The apparatus of claim 10, wherein the at least one processor is further configured to:
input any picture in the 2D picture set into a convolutional neural network, wherein the convolutional neural network outputs an n-level feature map P1 . . . Pn of the picture, and n>=2;
locate target proposal region in the P1 . . . Pn by using a region proposal network, wherein each proposal region comprises at least one anchor box;
when any of the proposal regions comprises at least two anchor boxes, screen the anchor boxes of each proposal region by adopting a non-maximum suppression algorithm, to reserve an anchor box of the at least two anchor boxes with a highest foreground score, and discard other anchor boxes;
for each anchor box in the P1 . . . Pn, divide the anchor box into a pooling unit with a first preset size, extract a characteristic value of each subunit by using max-pooling, and then output the pooled P1 . . . Pn;
map the pooled P1 . . . Pn to a fully-connected feature, identify an object category of each anchor box on the fully-connected feature and reduce a size of the anchor box; and
identify outline information of objects in region of each reduced anchor box by using a full convolutional network,
wherein the convolutional neural network comprises a residual network and a feature pyramid network,
wherein 3×3 convolution of the residual network is replaced with a depth wise separable convolution, and
wherein the feature pyramid network comprises a first pyramid and a second pyramid, and an output of the first pyramid from bottom layer to top layer is sequentially input from top layer to bottom layer of the second pyramid.

13. The apparatus of claim 10, wherein the detail feature information further comprises: whether the 2D picture is a separate target frame of an object.

14. The apparatus of claim 13, wherein the at least one processor is further configured to:
if the matching fails, construct the 3D model of the object based on the separate target frame of the object matched unsuccessfully.

15. The apparatus of claim 14, wherein the at least one processor is configured when constructing the 3D model of the object based on the separate target frame of the object matched unsuccessfully, to:
extract feature points of the object in the separate target frame;
identify registration points among the feature points in the separate target frame by matching the feature points of the object to registration point features;
extract an essential matrix of the separate target frame based on the feature points and the registration points;
solve intrinsic and extrinsic parameters of a camera based on the essential matrix;
convert two-dimensional coordinates of the feature points and the registration points into three-dimensional coordinates based on the intrinsic and extrinsic parameters of the camera;
judge whether there are other separate target frames of the object unanalyzed, if yes, return the extracted feature points of the object in the separate target frame, otherwise, generate a 3-dimensional point cloud based on three-dimensional coordinates of the feature points and the registration points, and complete geometric modeling of the 3D model of the object by using a Poisson curved surface reconstruction method based on the 3D point cloud; and
refine the texture information, the color feature information and the shape feature information of the object based on the separate target frame, and map the refined information to the 3D model of the object.

16. The apparatus of claim 14, wherein, after mapping the texture information and the color feature information of each object onto the 3D model of the object or constructing the 3D model of the object based on the separate target frame of the object matched unsuccessfully, the at least one processor is further configured to:
identify a posture of any object in any picture in the 2D picture set, and adjust the posture of the 3D model of the object to be consistent with the posture of the object;
acquire real scene information;
analyze the real scene information and camera position information to obtain an affine transformation matrix of the 3D model of the object projected on a camera view plane; and
merge the 3D model with a real scene video, wherein the 3D model of the object is imported with the affine transformation matrix, and display the 3D model and the real scene video together on an AR presenting device or other device.

17. The apparatus of claim 10, wherein the at least one processor is further configured to:
locate objects in any picture in the 2D picture set by using a superpixel and/or threshold segmentation method, wherein, if the picture comprises only one object, then the picture is a separate target frame of the one object; and
based on the locating of each object in the picture, extract a texture of each object by using tamura texture feature algorithm and wavelet transform, extract color feature information of each object by using a color histogram matching, and extract the shape feature information of each object by using a geometric parameter method.

18. A method for converting a 2D picture set to a 3D model, the 2D picture set comprising at least one picture, the method comprising:
   identifying a category and outline information of each object contained in each picture in the 2D picture set by using a deep learning algorithm, the outline information of each object being identified based on identifying an object category of an anchor box of a region within a feature map of the picture;
   extracting detail feature information of each object in each picture in the 2D picture set by using a computer vision algorithm, wherein the detail feature information includes texture information, color feature information and shape feature information of each object;
   matching each object to a base 3D model based on the category, the shape feature information, and the outline information of each object; and
   mapping the texture information and the color feature information of each object onto the base 3D model matched to the object.

19. The method of claim 18, wherein the identifying of the category and the outline information of each object contained in each picture in the 2D picture set comprises:
   inputting any picture in the 2D picture set into a convolutional neural network, wherein the convolutional neural network outputs an n-level feature map P1 . . . Pn of the picture, and n>=2;
   locating a target proposal region in the P1 . . . Pn by using a region proposal network, wherein each proposal region comprises at least one anchor box;
   when any of the proposal regions comprises at least two anchor boxes, screening the anchor boxes of each proposal region by adopting a non-maximum suppression algorithm, to reserve an anchor box of the at least two anchor boxes with a highest foreground score, and discard other anchor boxes;
   for each anchor box in the P1 . . . Pn, dividing the anchor box into a pooling unit with a first preset size, extracting a characteristic value of each subunit by using max-pooling, and then outputting the pooled P1 . . . Pn;
   mapping the pooled P1 . . . Pn to a fully-connected feature, identifying an object category of each anchor box on the fully-connected feature and reducing a size of the anchor box; and
   identifying the outline information of objects in region of each reduced anchor box by using a full convolutional network.

20. The method of claim 19, wherein the convolutional neural network comprises a residual network and a feature pyramid network, the feature pyramid network comprising a first pyramid and a second pyramid, an output of the first pyramid from bottom layer to top layer being sequentially input from top layer to bottom layer of the second pyramid, and
   wherein 3×3 convolution of the residual network is replaced with a depth wise separable convolution.

* * * * *